May 10, 1966 P. METZ 3,250,832
PROCESS FOR MAKING REFRACTORY ARTICLES
Filed July 13, 1961
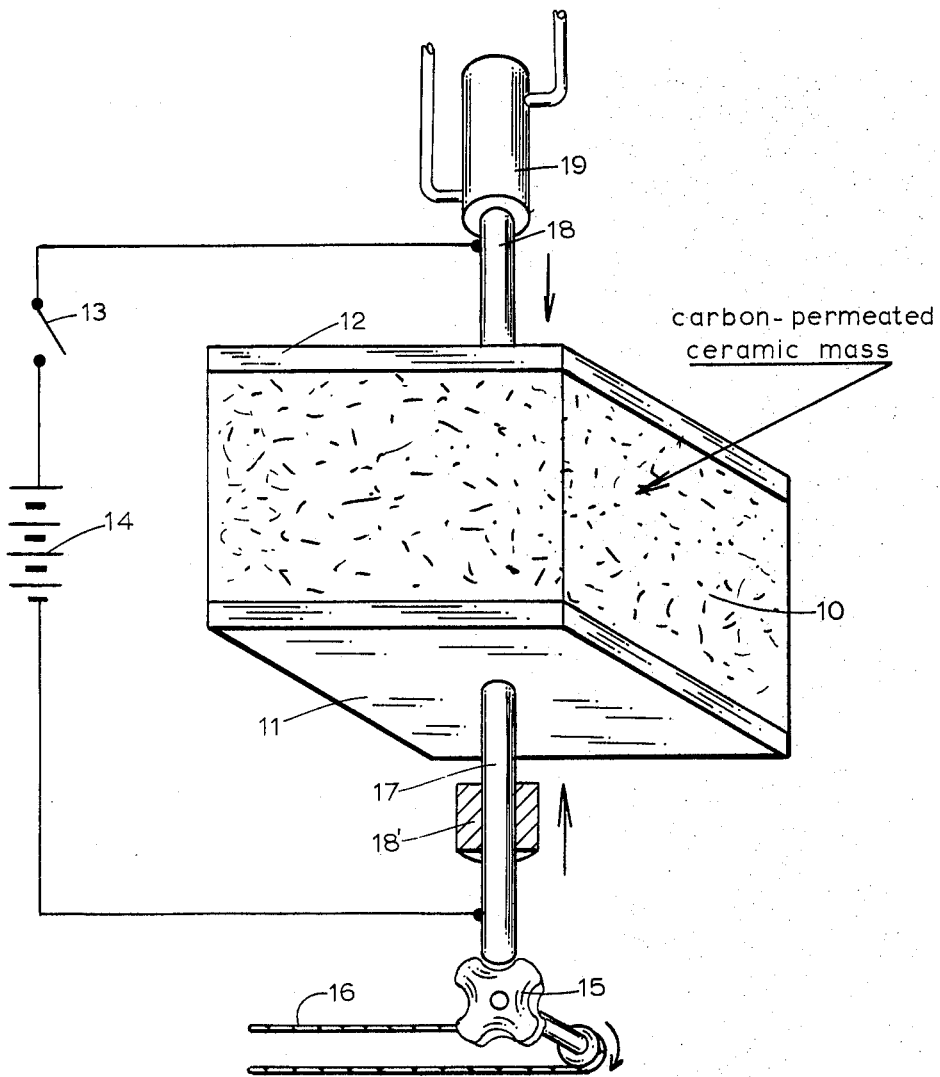
PAUL METZ
*INVENTOR.*
BY *Karl F. Ross*
AGENT United States Patent Office 3,250,832
Patented May 10, 1966

3,250,832
PROCESS FOR MAKING REFRACTORY
ARTICLES
Paul Metz, Dudelange, Luxembourg, assignor to Arbed, Acieries Reunies de Burbach-Eich-Dudelange, Luxembourg, a corporation of Luxembourg
Filed July 13, 1961, Ser. No. 123,885
Claims priority, application Luxembourg, July 15, 1960, 38,954, 38,955
5 Claims. (Cl. 264—27)

My present invention relates to a process for making articles of refractory material from ceramic particles which are sintered or fused into heat-resistant bodies.

It is an object of this invention to provide an improved process for sintering or fusing such ceramic materials, especially those which heretofore could be handled only with difficulty on account of their high melting points, in a manner which greatly facilitates not only the preparation of a highly refractory composition but also the manufacture of complete articles made therefrom.

A more particular object of this invention is to provide a process for expediting the manufacture of highly refractory compositions and particles from ceramics containing major proportions of magnesium oxide and/or carbonate, such as magnesites and dolomites, permeated by hydrocarbons and subjected to heat treatment with or without pressure as described in my two copending U.S. applications Ser. Nos. 123,619 and 123,884, filed on even date herewith.

A principal feature of my instant invention is the admixture with basic ceramic material, prior to the sintering of its particles, of a comminuted conductive material, notably carbon (e.g. in the form of graphite or carbides), or thermally unstable carbon compounds (especially hydrocarbons) which can be converted into free carbon, in a manner sufficient to render the mass of particles electrically conductive to enable the passage of a heating current therethrough, this current being at least partly instrumental in bringing the mass, with the aid of internal resistance heating, to the desired sintering or fusion temperature. If the carbonaceous additive is provided in excess of that needed for such electric heating, it may also serve to impart to the final product special desirable properties such as a high degree of refractoriness as morefully set forth in my aforementioned copending applications Another feature of the invention resides in imparting the desired shape of the final article to the sintered mass by conventional compacting methods, e.g. by compression or vibration, while this mass is still subject to the heating current or immediately thereafter and without appreciable intervening cooling; the resulting products have been found to exhibit improved physical properties including freedom from objectionable internal stresses. Thus, the final shaping may be carried out in a separate oven or directly in the sintering chamber, the heating electrodes in the latter case forming part of the mold itself. The electric heat treatment may, on the other hand also be applied to a body of relatively loosely coherent particles already preshaped to its ultimate configuration. Furthermore, the sintered body produced by the aforedescribed process may be recomminuted to furnish a mass of refractory particles adapted to be used, either alone or in admixture with other particles according to the requirements of grain-sizing techniques to obtain a compact mass, in the subsequent manufacture of finished articles therefrom by adhesive bonding, sintering or complete fusion.

The process according to the invention is preferably carried out in a non-oxidizing (i.e. inert or reducing) environment, yet in some cases it will be desirable to subject the hot refractory material after coalescence, or during the final phase of the sintering or fusion step to an oxidizing atmosphere for reducing its content of elemental carbon and its thermal as well as electrical conductivity. Other supplemental treatments, e.g. thermal recrystallization, are also possible.

The following examples are illustrative of the manner in which the invention may be carried into practice.

*Example I*

A comminuted ceramic material rich in magnesium compounds, such as dolomite or magnesite of the native or the sea-water type with grain sizes ranging up to 40 mm., is heated in known manner to a temperature (e.g. 1200° C.) just sufficient to produce decarbonization and light sintering of the particles. These particles are premeated, at a temperature of about 150° C., with tar and then heated to 800° C. in a coking operation whereby a mixture of reduced ohmic resistance, capable of passing an effective heating current when subjected to a moderate input voltage, is obtained. The mixture, which may have been preheated by conventional means to, say, 1,000°–1,500° C., is then traversed by an electric current in a heating chamber filled with a non-oxidizing atmosphere, such as nitrogen or furnace gas until its temperature reaches approximately 2,000° C.; this results in a very firm sintering of the refractory particles and in a graphitization of the carbonaceous material. The chamber may be supplementally heated, if need, by conventional means. During or immediately after this heat treatment the mixture may be compacted, by pressure and/or vibration, without removal from the heating chamber. The electrical resistance of the carbon/ceramic mixture may be further reduced, if desired, by the inclusion of lumps of graphite or silicon carbide therein.

The body of partially or completely coalesced particles ultimately obtained is then cooled, comminuted into fragments of a desired size, and admixed with tar or pitch preparatorily to being molded into a finished article. In a modification, the body is ground to a powder of very fine particle size, e.g. up to 2 mm., which is then admixed with relatively large grains of dolomite, magnesite and/or magnesium chromite whose size may be of the order of 2 to 20 mm., the two fractions being blended together according to conventional techniques for producing ceramic materials.

*Example II*

A powder of magnesium-rich ceramic material as defined above, admixed with tar and, if desired, a supplemental quantity of elemental carbon, is pressed into bricks or other shaped articles which are then heated to 800° C. in order to acquire the necessary conductivity for the further treatment by electric current as described in the preceding example. The sintered articles are, after cooling, ready for use.

*Example III*

High-purity magnesia or alumina, or quartz in comminuted (granular and/or powder) form, is admixed with about 5% (by weight) of graphite powder, or an equivalent quantity of other comminuted conductive material such as a metal (e.g. copper) or silicon carbide, and settled by pressure or vibration inside a mold of which at least two walls are constituted by electrodes (e.g. graphite plates) connected to a source of current for heating the mixture to a temperature of the order indicated in Example I. Upon attainment of the desired sintering temperature, within a non-oxidizing atmosphere, further compression (e.g. of 1000 kg/cm²) and/or vibration is applied to the mold for compacting the heated body. The latter is then subjected to cooling at very slow rate whereupon it is ready for use.

Example IV

High-purity magnesia is admixed with tar and pressed or cut into a prismatic blank whose dimensions may be 30 by 20 by 20 cm.; this blank is then fired in an inert or reducing atmosphere to a temperature of 800° C., advantageously under an ambient pressure of 30 atmospheres. The heat-treated blank is thereafter confined between two graphite electrodes and subjected to a sintering current as described in Example III, e.g. of 3,000 amperes with a potential difference of 90 volts across the electrode plates. When thus heated, the blank is removed from the circuit and introduced into a preheated mold for compaction under a pressure of 1200 kg./cm$^2$.

The sole figure of the accompanying drawing shows, somewhat diagrammatically, an arrangement for carrying out the process of Example III or IV. A body 10 of carbon-premeated, preferably lightly sintered ceramic particles rests on a lower graphite plate 11 and is overlain by a similar upper plate 12, the two plates (forming part of a mold not further illustrated) being connectable by a switch 13 across a source of electric power here shown as a battery 14. A vibrator, shown as a cam 15 which is rotated by a transmission 16, acts upon the lower end of a mounting rod 17 that is guided in a bearing 18' and supports the plate 11; a similar mounting rod 18 for plate 12 is connected to the piston (not shown) of a hydraulic cylinder 19 to exert the desired compacting pressure upon the sintered body 10. The assembly of body 10 and mold 11, 12 is enclosed in a heating chamber, not shown, filled advantageously at a pressure greater than atmospheric with nitrogen, hydrogen or other non-oxidizing gas which, prior to removal of the body 10, may be replaced by air to oxidize some of the elemental carbon in that body.

It may be mentioned that the carbonaceous additive used in the present process may also advantageously be a hydrocarbon impregnant of the type disclosed in my copending U.S. application entitled "Organic Binder and Process for Making Same" Ser. No. 123,612, filed on even date herewith and now abandoned, i.e. a coal-tar or petroleum distillate boiling at 150° to 400° C. which has been subjected to a heat treatment at 150° to 500° C. at absolute pressures upward of two atmospheres.

I claim:

1. A process for making a coherent body from a mass of refractory ceramic particles consisting at least in major part of magnesium compounds, comprising the steps of admixing a thermally unstable bituminous hydrocarbon with said mass while the particles thereof are in an at most lightly cohesive state, initially heating the mixture thus obtained to a degree sufficient to cokify said binder whereby a conductive deposit of carbon is formed throughout said mass, subsequently passing a heating current through said deposit, and heating said mixture with at least the assistance of said current to a temperature sufficient to sinter said particles together to a firmly coherent state.

2. A process according to claim 1 wherein at least the initial heating of said mixture is carried out in a non-oxidizing environment.

3. A process according to claim 1 wherein the mass of sintered particles is subsequently comminuted and recombined into a final product.

4. A process according to claim 1 wherein said mass is subjected to compaction upon at least partial coalescence of its particles and prior to cooling.

5. A process according to claim 1 wherein the initial heating is carried out at a temperature of approximately 800° C.

References Cited by the Examiner

UNITED STATES PATENTS

| 166,433 | 8/1875 | Weston | 18—54.7 |
|---|---|---|---|
| 656,077 | 8/1900 | Alefield | 18—54.7 |
| 1,390,823 | 9/1921 | Sieurin | 18—54.7 |
| 1,430,724 | 10/1922 | d'Adrian | 264—27 |
| 1,479,107 | 1/1924 | Ohman | 106—56 |
| 2,335,325 | 11/1943 | Wainer | 25—156 |
| 2,799,912 | 7/1957 | Greger | 25—157 |
| 2,952,605 | 9/1960 | Varda | 106—56 |
| 3,015,850 | 1/1962 | Rusoff et al. | 25—156 |

FOREIGN PATENTS

| 874,253 | 8/1961 | Great Britain |
|---|---|---|
| 330,745 | 6/1930 | Great Britain |

ROBERT F. WHITE, *Primary Examiner*

ALEXANDER H. BRODMERKEL, *Examiner.*

G. A. KAP, R. B. MOFFITT, *Assistant Examiners.*